July 5, 1932.  C. BURNETT  1,865,829
FARM STOCK DRINKING TANK
Filed May 29, 1930   2 Sheets-Sheet 1
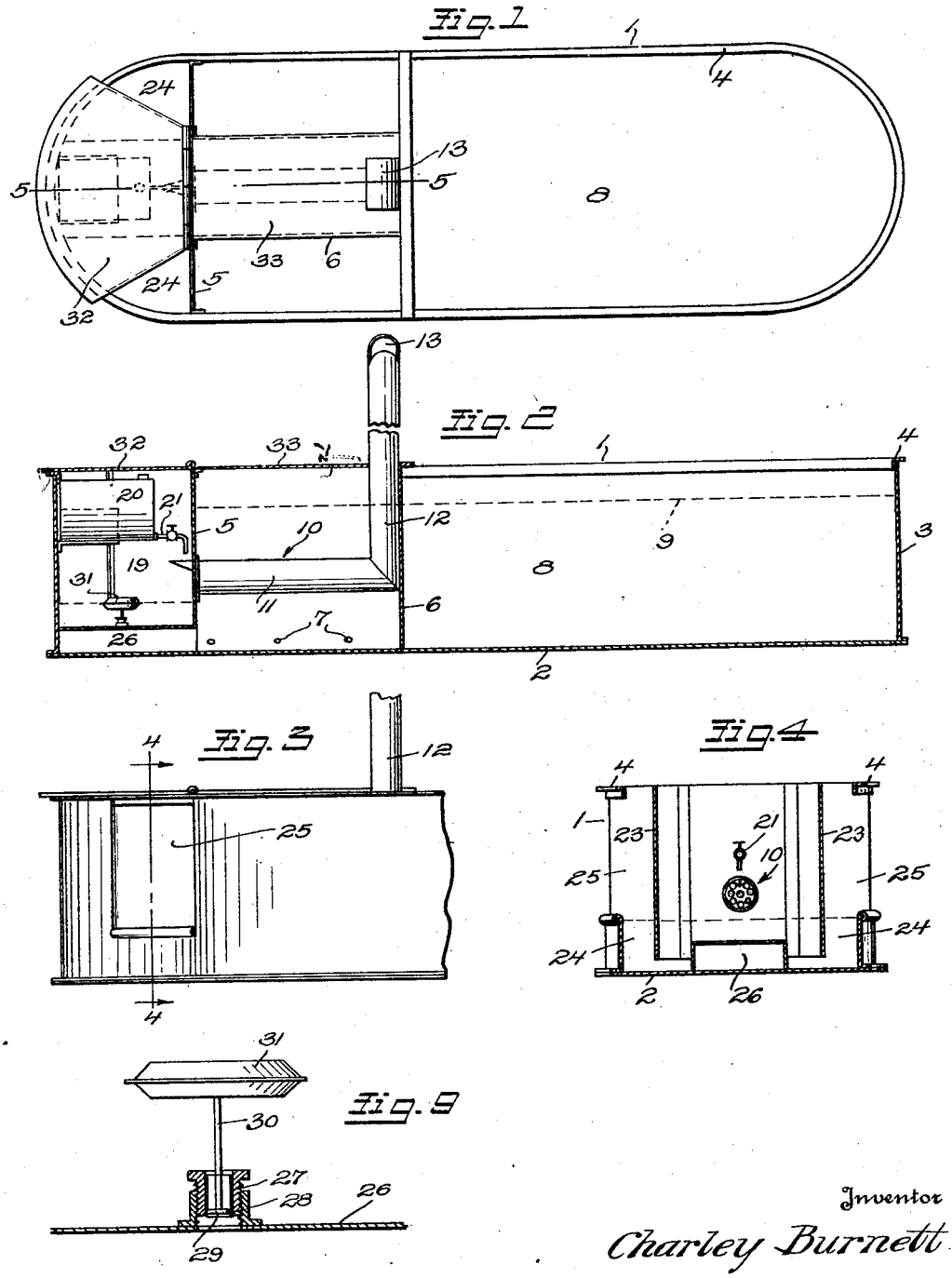

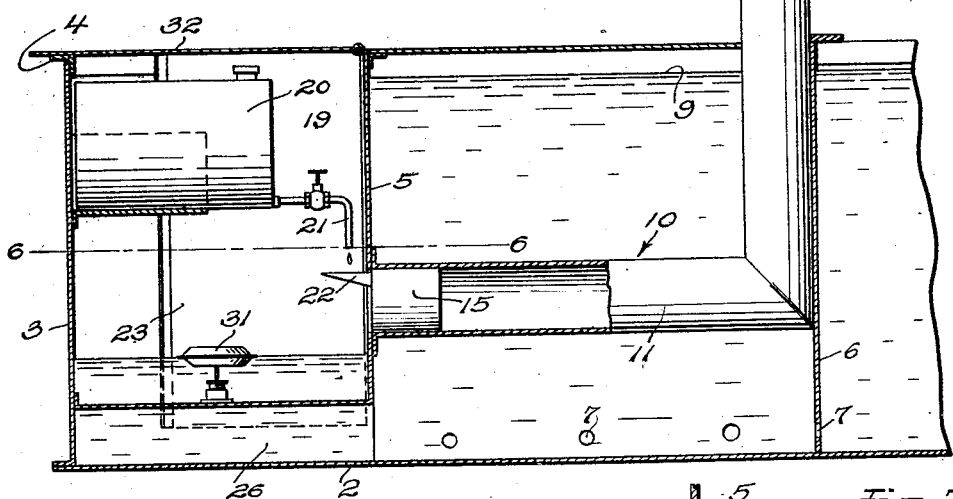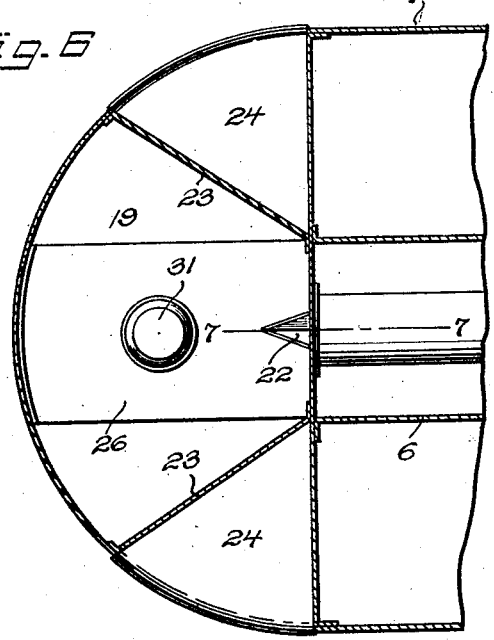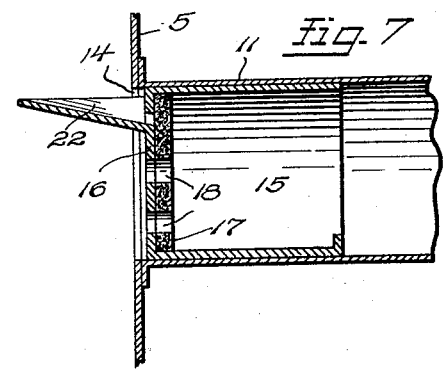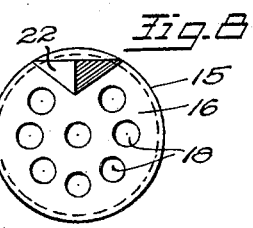

Patented July 5, 1932

1,865,829

UNITED STATES PATENT OFFICE

CHARLEY BURNETT, OF WASHINGTON C. H., OHIO

FARM STOCK DRINKING TANK

Application filed May 29, 1930. Serial No. 457,444.

This invention relates to improvements in drinking tanks for farm stock and the like, and it is a primary object of the present invention to provide a water-containing tank of this character with improved means for effecting the heating of the water during periods of cold weather in order that the water may be kept in its normal liquid state and in a protected and fresh condition.

It is another object of the invention to provide a drinking trough or tank with a water-containing chamber through which passes a horizontally disposed combustion flue, one end of the flue being arranged in communication with a vertically disposed stack flue while the other end of the combustion flue is provided with a removable burner unit so formed as to effect efficient carburetion of oil with atmospheric air and to thereby provide for efficient combustion in said combustion flue, the walls of the combustion flue being formed from sheet metal so that desired heat transfer between the walls of the combustion and stack flues and the surrounding liquid takes place.

It is another object of the invention to provide a watering tank of the character specified with partition walls so formed as to produce a hot water receptacle in which the burner flues are arranged and to dispose the hot water receptacle in a large chamber which is adapted to contain water to be used for drinking purposes by larger farm animals and wherein the container at one end is provided with a plurality of smaller compartments adapted for the use of the smaller farm animals, valve mechanism of an automatic type being provided for enabling the water in the smaller compartments to be maintained at a level lower than that in said hot water receptacle and its surrounding chamber.

It is a still further object of the invention to heat the water contained in said smaller compartments to prevent its freezing during cold weather and for sustained periods of time when the compartments are not used by drinking animals.

It is also an object of the invention to provide a stock drinking tank of the character set forth which is of simple compact construction and wherein the present mechanism is of a type which requires little attention for prolonged periods of use and is not apt to get out of order or to require repair.

With these and other objects in view, which will appear as the description proceeds, the invention consists in the novel features of construction, combinations of elements and arrangements of parts, hereinafter fully described and pointed out in the appended claims.

In the accompanying drawings:

Figure 1 is a top plan view of a drinking tank constructed in accordance with the present invention, Figure 2 is a vertical longitudinal sectional view taken through the tank, Figure 3 is a side elevation of one end of the drinking tank which is adapted for use by smaller animals, Figure 4 is a transverse vertical sectional view taken through the tank on the line 4—4 of Figure 3, Figure 5 is a vertical sectional view on an enlarged scale taken on the plane indicated by the line 5—5 of Figure 1, Figure 6 is a horizontal sectional view on the plane disclosed by the line 6—6 of Figure 5, Figure 7 is a detail vertical sectional view on the line 7—7 of Figure 6, Figure 8 is a front elevation of the burner unit, and Figure 9 is a detail view of the float valve mechanism.

Referring more particularly to the drawings, the numeral 1 designates my farm stock drinking tank in its entirety. The tank comprises a sheet metal structure formed to include a horizontal base or bottom 2. From the base there is provided an upstanding substantially vertical side wall 3. The lower edge of the side wall 3 is flanged and is welded or otherwise secured to the outer marginal surfaces of the base 2. The top edge of the wall 3 is formed with a reinforcing bar 4 of angular construction, which adds stiffness to the wall structure of the tank so that the latter will be both rigid and strong in design.

Extending transversely across the interior of the tank, adjacent to one end thereof is a vertical partition 5 and connected with this partition and disposed centrally and longitudinally in the tank is a substantially rectangular casing 6 which is formed with an open top and has its side walls, contiguous to their lower portions, provided with a plurality of openings 7 which permit the water level in the casing 6 to be maintained constant or uniform, which obtains in the major drinking chamber 8, such water level being indicated by the numeral 9 in Figure 2 of the drawings. This water level is, of course, subject to fluctuation as the water in the chamber 8 is consumed by drinking animals, and in this connection it will be understood that the chamber 8 is adapted to be used by the larger farm animals, such as horses, cattle and the like.

To keep the water in the chamber 8 in a heated state, that is to say above the freezing temperature of water during periods of cold weather, there is provided in the casing 6, and below the water level thereof an oil burning heater which is designated generally by the numeral 10. This heater is formed to comprise a horizontally extending combustion flue 11 which terminates at one end in an upstanding draft flue 12, the upper end of the latter being provided with laterally disposed draft outlets 13. The combustion flue 11 is flanged at one end, as shown in Figures 5 and 7, and communicates with an opening 14 formed in the partition 5. Arranged to be removably positioned in the forward end of the flue 11 is a vaporizing unit 15 which comprises a tubular metallic body of smaller diameter than the flue 11. One end of the unit 15 is formed with a perforated wall 16 while the other end thereof is open. Secured to the inner face of the wall 16 is a pad 17 of asbestos and this pad is also perforated as at 18 to correspond with the perforations in the wall 16 in order to permit air, drawn from the atmosphere to pass freely into the combustion flue to promote combustion therein.

Mounted in a compartment 19 formed in one end of the tank is an oil tank 20, which is formed with a valved outlet pipe 21. Disposed in registration with the discharge end of this pipe is a trough 22 which is formed with the perforated wall 16 of the vaporizing unit. In operation oil drops in regulated quantities from the pipe 21 onto the trough 22 and then passes through the perforated wall 16 upon the pad 17. Due to the heat in the combustion flue and the passage of air through the perforated wall, the oil is vaporized and properly commingled with air to produce a combustible mixture which, in turn, is burned in the combustion flue 11. The walls in the flue 11 are preferably of thin sheet metal construction so that effective heat transfer takes place between the water in the casing 6 and the heated walls of the flue 11 and to some extent of the flue 12. By this arrangement the water contained in the various compartments and chambers of the trough is maintained even under severe climatic conditions at a temperature sufficiently elevated to prevent freezing thereof. The heater mechanism is essentially simple yet efficient in design and is very practicable in apparatus of this kind in that it requires but little attention in keeping the same in proper operating condition and is not apt to blow out or to produce clogging carbon deposit when in service.

To provide for the drinking of smaller animals, such as pigs, hogs and the like, the compartment 19 is formed with side walls 23 which, as shown in Figure 4, have their lower edges spaced from the bottom or base wall 2 of the tank. These side walls 23 in connection with the partition 5 produce supplemental drinking chambers 24 in one end of the tank and on opposite sides of the latter, the side walls 3 of the tank adjacent to the chambers 24 being provided with substantially rectangular openings 25, as shown in Figure 3, which provide access to the chambers 24. To keep the water in the chambers 24 in a heated condition, the lower portion of the partition 5 is formed in this instance with a longitudinally extending duct 26. This duct is arranged on the base wall 2 of the tank and communicates at one end with the hot water receptacle formed by the casing 6 in order that the heated water developed in the casing 6 may be permitted to directly engage with the walls of the duct 26 in order to keep the relatively small bodies of water, which are at a lower level than those in the casing 6 and the chamber 8, from freezing in severe weather conditions and particularly when the chambers 24 are not used for prolonged periods of time.

To control the water level in the drinking chambers 24, the upper wall of the duct 26, as shown in Figure 9, is provided with a threaded nipple 27 formed with the valve seat 28. A valve 29 is adapted to engage with the seat 28 and the stem 30 of said valve has its upper end provided with a float 31 which is adjustable through the provision of the nipple 27 in a vertical plane. By the provision of this float operated valve heated water is permitted to pass directly from the hot water receptacle into the lower portion of the compartment 19 and thence into the drinking chambers 24, keeping the water in such chambers at a desired temperature. Ample heat radiating surface is produced by the duct 26 to prevent freezing of the water in the chambers 24 when animals are not consuming at frequent intervals water therefrom such, for example, as at night, and for this reason use is made of the heat radiating surfaces of the duct 26 to additionally heat the small quantity of water which is maintained in the chambers 24 and in the bottom of the compartment 19.

In view of the foregoing it will be seen that the present invention provides a drinking tank for farm animals which is especially useful in cold weather, although the construction of the tank is such that it may be employed efficiently for all seasons with or without the use of the heater. The specific construction of the improved heater has been set forth and claimed in my co-pending application Serial No. 457,443 filed May 29, 1930. The top of the compartment 19 may be protected by a hinged cover plate 32. By locating the hot water receptacle in the center of the chamber 8, drinking animals cannot be harmed by contact with the heated surfaces of the flues 11 and 12 or the walls of the casing 6. Likewise, this is true in reference to the supplemental chambers 24, since the drinking animals are protected by the baffle walls 23 from the heated surfaces of the compartment 19. Due to the operation of the heater, the water within the casing 6 contains a considerably higher temperature than that larger body of water located in the chamber 8, and this heated water may be used for many useful purposes in the care of farm animals. The hot water receptacle may or may not be provided with a removable cover 33. The float valve mechanism provides a simple yet effective arrangement for maintaining a lower liquid level in the chambers 24 than that which exists in the major chamber 8, and as the water is consumed from the chambers 24 said float valve mechanism opens to permit of the replenishment of the withdrawn water by supplying additionally heated water from the receptacle 6. The tank is simple to operate and maintain and requires but little manual attention. In fact, except for the maintenance of a desired body of water in the chamber 8 and the replenishment of the fuel tank 20, the operation of the tank is automatic. The specific heater disclosed is extremely efficient in operation and produces substantially smokeless combustion. The combustion is so controlled that while the walls of the flue 11 attain a high temperature in the operation of the heater, the temperature of the stack gases leaving the top of the flue 12 is extremely low, a condition which is indicative of the fact that the developed heat is efficiently transmitted to the liquid medium surrounding said flue.

While I have described what I consider to be the preferred form of the present invention, nevertheless it will be understood that changes and variations may be made in the specific construction of my improved tank without departing from the spirit and scope of the invention as the latter has been set forth in the following claims.

What is claimed is:

1. A farm stock drinking receptacle comprising an open topped liquid containing tank formed at one end with a divisional wall separating the tank into primary and secondary drinking compartments, a submerged oil burning heater comprising a flue stationarily mounted in connection with said wall in the primary compartment, the opposite ends of said flue opening to the atmosphere, an oil container mounted in the upper portion of the secondary compartment above the liquid level therein for supplying said heater with regulated quantities of oil, and automatic valve mechanism for governing liquid flow between the primary and secondary compartment, said valve mechanism serving to maintain the liquid level in the secondary compartment below that which obtains normally in the primary compartment, the liquid level in the secondary compartment being below the plane of the heater in the primary compartment.

2. A farm stock drinking receptacle comprising an open topped water containing tank, a divisional wall arranged in said tank and dividing the latter into primary and secondary drinking compartments, a casing arranged in said primary compartment and disposed centrally and longitudinally thereof adjacent to said divisional wall, a submerged heater arranged in said primary compartment and casing and comprising a flue secured at one end to said divisional wall and disposed substantially horizontally in said casing, said flue terminating in an upwardly directed outlet stack communicating at its upper end with the atmosphere, the inlet end of said flue being disposed in registration with an opening formed in said divisional wall and disposed above the liquid level in the secondary compartment, a removable vaporizing element arranged in the inlet end of said flue, and means disposed in said secondary compartment above the liquid level therein for delivering regulated quantities of oil to said vaporizing element.

3. A farm stock drinking receptacle comprising an open topped water containing tank, a divisional wall arranged in said tank and dividing the latter into primary and secondary drinking compartments, a casing arranged in said primary compartment and disposed centrally and longitudinally thereof adjacent to said divisional wall, a submerged heater arranged in said casing comprising a flue secured at one end to said divisional wall and having its other end communicating with the atmosphere, an extension formed with said casing projecting into the secondary compartment, and means formed in connection with said extension for regulating the liquid level in said secondary compartment.

In testimony whereof I affix my signature.

CHARLEY BURNETT.